United States Patent [19]
Ermacora et al.

[11] Patent Number: 5,794,424
[45] Date of Patent: Aug. 18, 1998

[54] MOWING MACHINE HAVING A HARVESTING MECHANISM WITH A LIGHTENING DEVICE

[75] Inventors: Rino Ermacora, St. Jean Saverne; Martin Walch, Dettwiller; Bernard Wattron, Saverne; Joel Wilhelm, St.-Louis, all of France

[73] Assignee: Kuhn S.A., Saverne Cedex, France

[21] Appl. No.: 644,059

[22] Filed: May 10, 1996

[30] Foreign Application Priority Data

May 10, 1995 [FR] France .................... 95 05692

[51] Int. Cl.$^6$ ........................... A01D 34/66
[52] U.S. Cl. ................... 56/15.1; 56/6; 56/15.2
[58] Field of Search ............ 56/6, 7, 15.1, 15.2, 56/15.5, 15.7, 15.9, DIG. 9, DIG. 11, DIG. 14

[56] References Cited

U.S. PATENT DOCUMENTS 3,869,861  3/1975  Case .................... 60/413
4,920,732  5/1990  Lee et al. ............. 56/10.2

FOREIGN PATENT DOCUMENTS 0149870  7/1985  European Pat. Off. .
0361573  4/1990  European Pat. Off. .
2053645  2/1981  United Kingdom .

*Primary Examiner*—Michael J. Carone
*Assistant Examiner*—Robert Pezzuto
*Attorney, Agent, or Firm*—Oblon, Spivak, McClelland, Maier & Neustadt, P.C.

[57] ABSTRACT

A mowing machine includes a harvesting mechanism which extends during mowing transversely to a working direction, and a lightening device for the harvesting mechanism which includes at least one elastically deformable member whose action can be adjusted by way of an adjustment device connected to the elastically deformable member. The elastically deformable member can include a deformable envelope which contains a gas under adjustable pressure. The adjustment device can include a supply circuit provided with at least one electrovalve or gate connected to the deformable envelope. In an alternative embodiment, the adjustment device can include at least one jack connected to a mechanical spring, and a supply circuit provided with at least one gate or electrovalve connected to the jack. The elastically deformable member of the present invention permits the harvesting mechanism to quickly adjust to a relief of the terrain in which the mowing machine operates while preserving a certain amount of lightening of the harvesting mechanism during its adjustment.

28 Claims, 9 Drawing Sheets

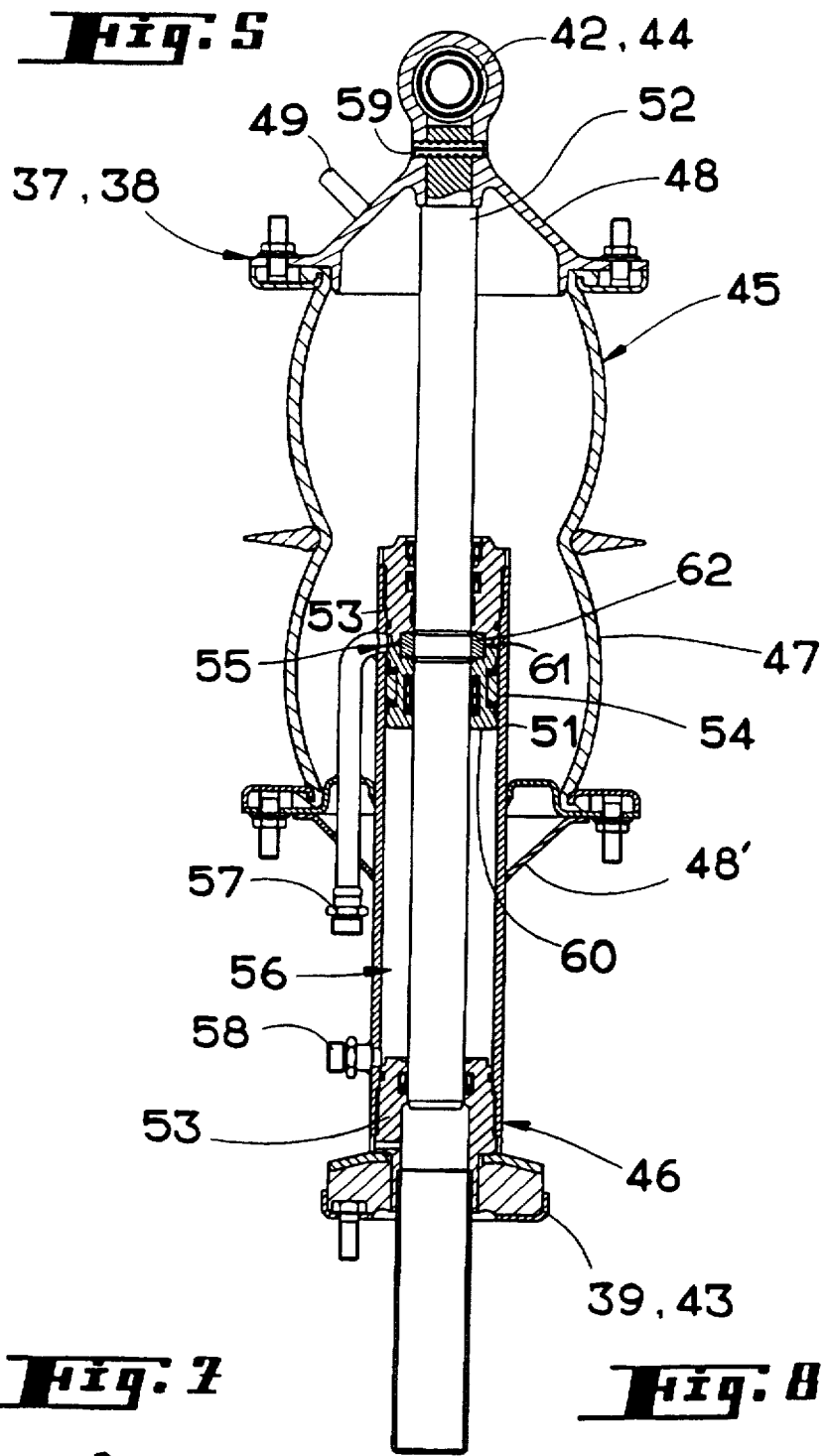
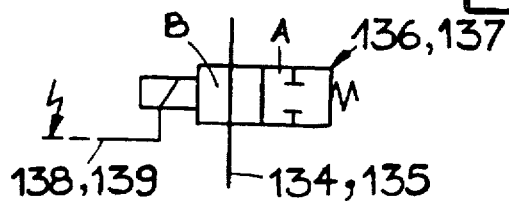
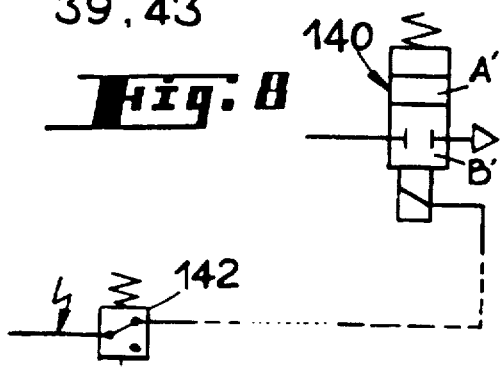

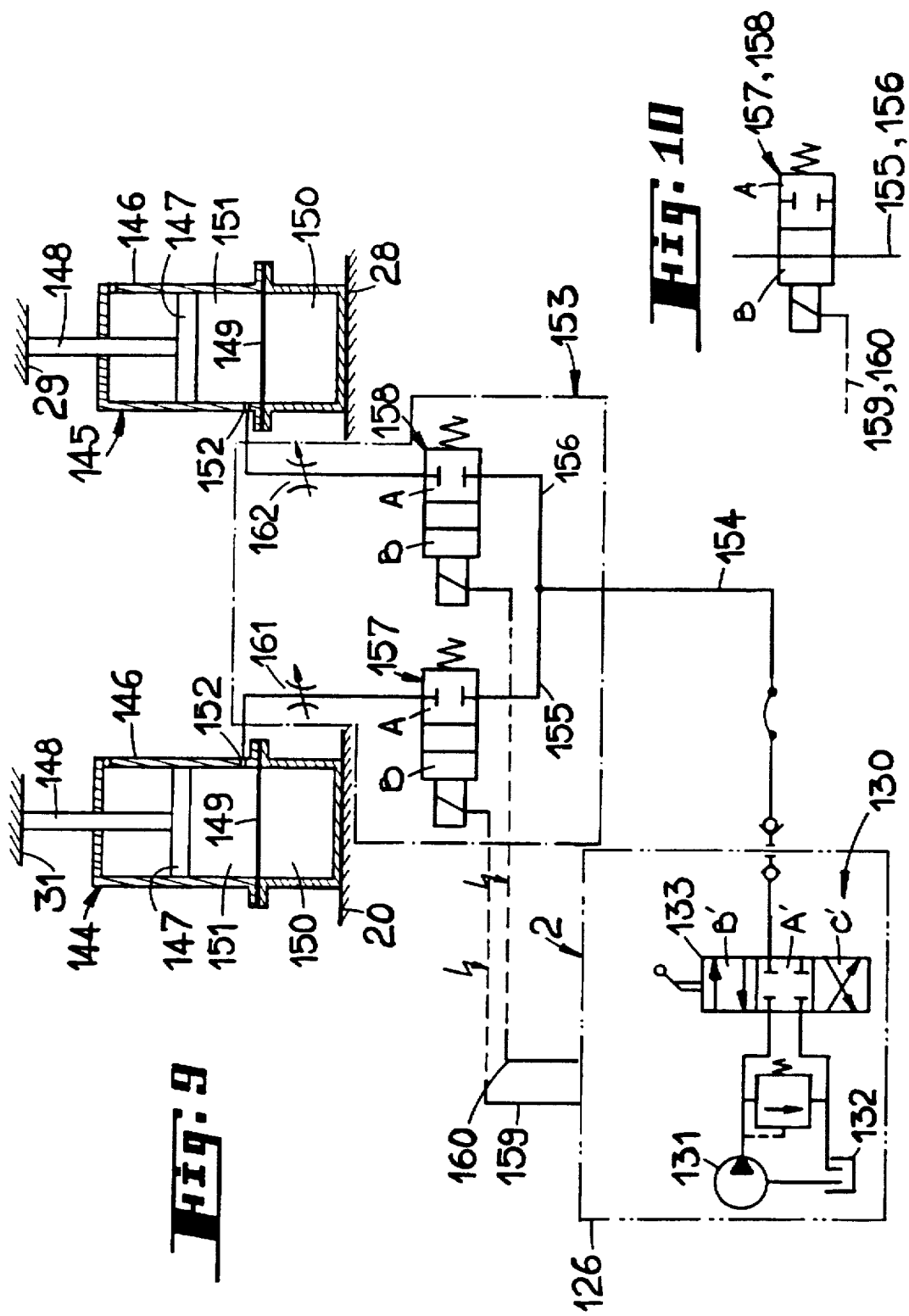

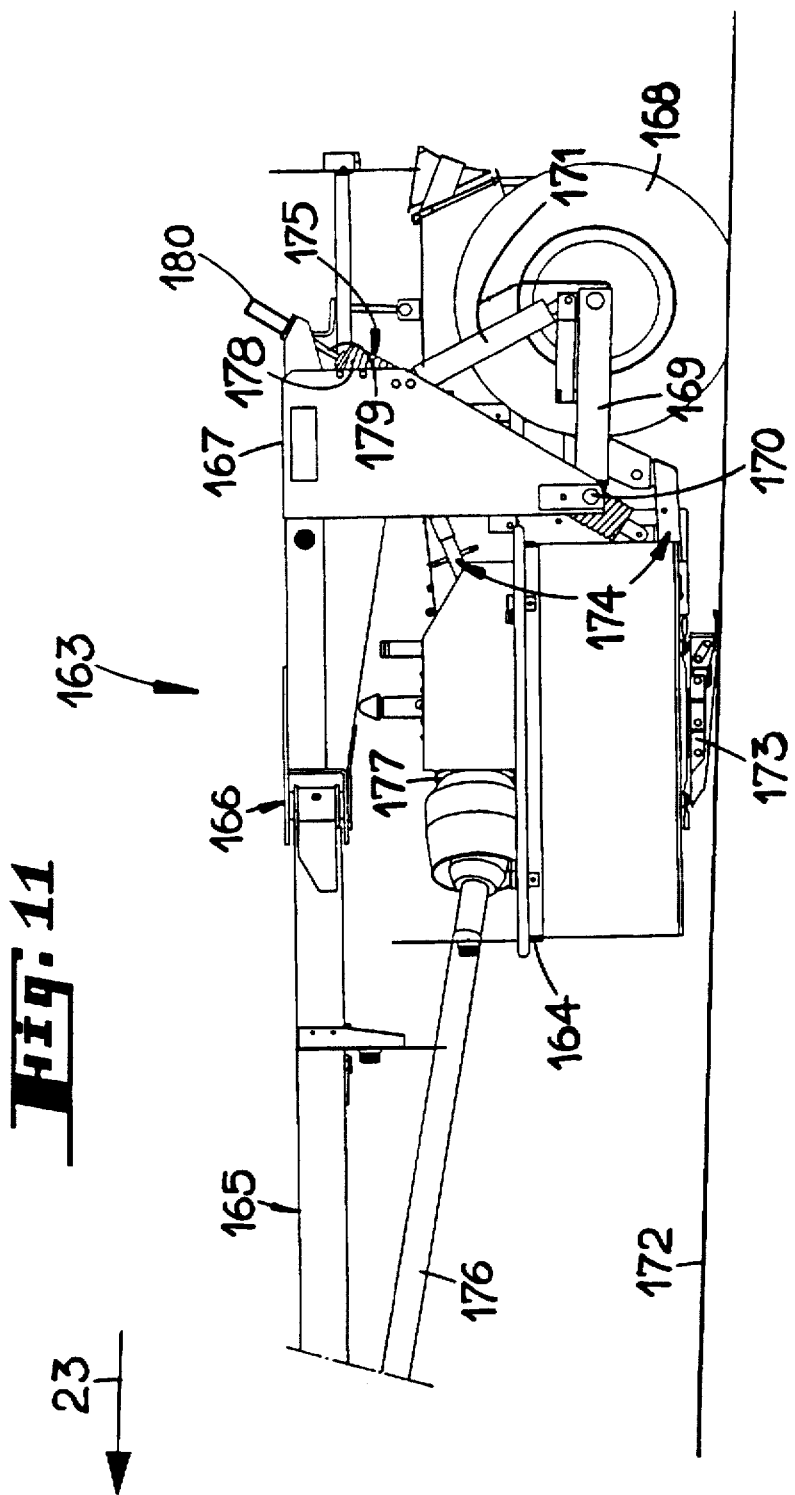

MOWING MACHINE HAVING A HARVESTING MECHANISM WITH A LIGHTENING DEVICE

BACKGROUND OF THE INVENTION

Field of the Invention

This invention relates to a mowing machine which includes a harvesting mechanism which extends during mowing transversely to a working direction, and a lightening device of the harvesting mechanism which includes at least one elastically deformable member whose action can be adjusted by means of an adjusting device connected to the elastically deformable member.

The value of the harvesting mechanism lightening of a mowing machine is important for the quality of the mowing and will depend on the working conditions (type of terrain, nature of product to be harvested). Too much lightening will not allow the harvesting mechanism to remain continually in contact with the ground. The result will be an unacceptable irregular cutting. Insufficient lightening, on the other hand, will increase the risk of jamming and of creating trails of uncut product due to accumulation of dirt on the front edge of the cutting mechanism, will increase the power which is required in order to pull the mowing machine during work, will increase wear, diminish the quality of the harvested product, and will damage the field of vegetables.

The use of an elastically deformable member allows the harvesting mechanism to quickly follow the relief of the terrain in which the mowing machine operates while preserving a certain amount of lightening of the harvesting mechanism during its movement. The ability to quickly follow the terrain relief is very important because of the forward speeds that can now be achieved with mowing machines.

DISCUSSION OF THE BACKGROUND

It is known that one can use mechanical tension springs, mechanical compression springs, torsion bars, deformable jackets filled with air or nitrogen accumulators combined with hydraulic jacks.

A mowing machine in which the harvesting mechanism is made lighter by means of two mechanical traction springs is, for example, known through the document GB-A-2,053, 645. This mowing machine includes a harvesting mechanism which extends, during operation, transversely to the working direction. This harvesting mechanism is comprised of a cutting bar fitted out with rotating disks which are used to cut the product to harvest, and of a conditioning rotor used to process the product cut by the rotating disks.

This harvesting mechanism is suspended in a frame by means of a deformable quadrilateral which allows heightwise displacement of the harvesting mechanism with respect to the frame.

The frame includes two wheels by means of which it rolls along the ground, as well as a tongue by means of which the mowing machine is attached to a drive vehicle.

The harvesting mechanism is made lighter by using two mechanical traction springs which extend on both sides of the harvesting mechanism and are installed between the harvesting mechanism and the frame.

A regulating bolt provided at the level of the connection of each spring to the frame allows one to adjust the tension of the spring, that is to say the amount of lightening achieved by the latter. To accomplish this one turns each regulating bolt to tighten the corresponding spring until one obtains the desired lightening. In order to obtain optimal lightening the user in general will conduct several tests which requires one, on each occasion, to interrupt mowing and to get down from the drive vehicle.

One will easily understand that this operation can take a lot of time, all the more that the initial regulation done when the mowing machine is clean risks to become quickly distorted during operation because of the progressive accumulation of dirt and vegetable debris on the harvesting mechanism (cutting bar, conditioning channel, protection member surrounding the cutting bar).

Considering the time which is required by precise regulation of the amount of lightening of the harvesting mechanism and the increase of this value during operation it is quite likely that in practice this related mowing machine is rarely regulated in an optimal manner.

A related mowing machine equipped with a device for lightening its harvesting mechanism which employs nitrogen accumulators combined with hydraulic jacks is described in the document EPA-0,149,870. This mowing machine includes a harvesting mechanism which extends, during operation, transversely to the working direction. This harvesting mechanism includes a frame in which a cutting bar is attached which is provided with rotating disks that are used to cut the product to harvest, and in which conditioning rollers are guided in rotation and are used to process the product cut by the disks. This harvesting mechanism rests on the ground by means of two wheels and is to be connected to a tractor by means of a tongue.

Each wheel extends behind a corresponding longitudinal end of the harvesting mechanism and is connected there by means of a wheel arm. Each wheel arm bears, at its trailing end, the corresponding wheel and is connected to the harvesting mechanism, at its forward end, by means of a horizontal articulation shaft which extends, during operation, transversely to the working direction. In addition, between each wheel arm and the harvesting mechanism there is installed a lifting and lightening member.

Each lightening and lifting member includes a first hydraulic jack. The joint action of the two first hydraulic jacks allows one to lift the harvesting mechanism.

In a first implementation, in which the tongue is connected to a longitudinal end of the harvesting mechanism, each lifting and lightening member subsequently includes a second hydraulic jack connected to a gas accumulator. Each second hydraulic jack and its gas accumulator thereby constitute a deformable casing whose gas pressure can be adjusted. The joint action of these two deformable casings allows one to decrease the pressure with which the harvesting mechanism rests on the ground. The pressure value with which the harvesting mechanism rests on the ground can be adjusted.

To accomplish this one first injects some oil into the two first hydraulic jacks until the latter are extended to their maximum length. In this position the harvesting mechanism is fully elevated. By continuing the supply of oil it will then happen that the second hydraulic jacks are filled, which will have the effect of increasing the pressure of the gas contained in the gas accumulators. When the supplied quantity of oil is adequate one stops the delivery, one blocks each second hydraulic jack by means of a plug screw and one again lowers the harvesting mechanism, allowing the oil contained in the first hydraulic jacks to return to the supply source.

Following this operation the pressure of the gas contained in the two gas accumulators is maximum. It is then necessary to again bring this pressure to the appropriate value by causing a certain quantity of oil to leave the second hydraulic jacks by means of the plug screws. Of course, the pressure of the gas contained in each accumulator can be read precisely on its respective pressure-gauge, but it will be necessary to also conduct several tests in order to obtain the optimum value of lightening.

In the EP-A-0,149,870 document, a mowing machine is also described whose lightening device makes use of two air bags.

In this other related mowing machine the tongue is connected to the central part of the harvesting mechanism, which allows one to alternately mow on both sides of the tractor by placing the harvesting mechanism in the proper position.

In this implementation, each lifting and lightening member will include, in addition to the first hydraulic jack, an air bag whose pressure is adjustable. The joint action of these two air bags allows one, in this case also, to decrease the pressure with which the harvesting mechanism rests on the ground.

Because it is a given fact that the harvesting mechanism must work alternately on the right and on the left side of the tractor, there is reason to modify alternately, for each change of position, the value of the pressure in the two air bags. For this purpose, each air bag is connected to a gate which allows one to cause air to penetrate into the air bag or for air to leave from the air bag, and whose action is controlled by the tongue. Thus, for each rotation of the tongue the pressure of the air contained in one of the air bags is increased to a first predetermined value, while the pressure of the air contained in the other air bag is decreased to a second predetermined value. The adjustment of these values is achieved manually directly on the gates installed near the trailing end of the tongue and whose design is very complex and makes use of three metal springs which must cooperate with one another and of numerous seals, which poses a risk of making their functioning relatively risky.

Another mowing machine equipped with a device for lightening its harvesting mechanism which makes use of two air bags is described in the document EP-A-0,570,315.

This related mowing machine includes a harvesting mechanism which extends, during operation, transversely to the working direction. It also includes an attachment by the intermediary of which it can be attached to the three points lifting device of a tractor.

The harvesting mechanism is connected to the attachment by means of an oscillating arm. This oscillating arm is connected, at one of its ends, directly or indirectly to the attachment by means of a first articulation with a geometric axis directed forward. At its other end the oscillating arm is connected to one of the ends of the harvesting mechanism by means of a second articulation with a geometric axis at least approximately parallel to the geometric axis of the first articulation.

At the opposite end of the harvesting mechanism there is installed a wheel connected to the harvesting mechanism by means of a quadrilateral deformable in a plane which is at least approximately vertical.

Between the oscillating arm and the harvesting mechanism there is installed a first lifting and lightening member, while a second lifting and lightening member acts on the deformable quadrilateral.

This first lifting and lightening member and this second lifting and lightening member each include a hydraulic jack which is used to lift the respective end of the harvesting mechanism for transport.

These two lifting and lightening members each further include a deformable bag containing air under pressure and installed in parallel with the corresponding lifting hydraulic jack. These two deformable bags thus fulfill the function of lightening the harvesting mechanism which allows the harvesting mechanism to rest with optimal pressure on the ground.

In order to allow the user to adjust the value of lightening of the harvesting mechanism of this related mowing machine for the working conditions that are experienced, each deformable bag is provided with a valve through which the user can cause entrance or discharge of air in order to modulate the pressure inside the deformable bag. A greater pressure will produce more lightening, while weaker pressure will produce less lightening.

In this related mowing machine there is a provision for forcing air into the deformable bag by means of a simple air pump. This means that the user should, here just as in the preceding mowing machines, make several tests of successive mowing until each deformable bag is inflated to the proper pressure. This also requires, on each occasion, interrupting the mowing and getting down from the tractor.

In the document U.S. Pat. No. 4,920,732 a mower is described which includes a small tractor and a mower installed forward of the latter by means of a quadrilateral deformable in the vertical plane. A hydraulic jack used in particular to lift the mower is installed directly between the deformable quadrilateral and the tractor.

This hydraulic jack, of the simple effect type, is supplied with oil by a delivery source through a supply circuit. The supply source consists of a hydraulic power unit which includes, in a known manner, a pump and a reservoir. In the supply circuit loop which contains the pump there is an adjustable operator control valve installed, while a pipe branched to the loop between the pump and the valve is used to supply the small chamber of the hydraulic jack. Thus, by adjusting the valve, one can modulate the value of pressure upstream from the valve, which also means the pressure in the pipe which supplies the hydraulic jack. This pressure in the small chamber of the hydraulic jack translates into a transfer of weight from the mower to the front wheels of the tractor.

In order to lift the mower from the ground the user completely blocks the valve so that all of the oil supplied by the pump will penetrate into the hydraulic jack.

If, during use, the mower encounters a bump on the ground it will be shifted upward. Once this happens the rod of the hydraulic jack will be displaced quite quickly in the cylinder of the jack and the oil discharged by the pump will very quickly enter the small chamber. As soon as the bump is overcome the weight of the mower will again draw the rod outside the cylinder forcing a part of the oil contained in the small chamber to leave it. But, because of the pressure which is in the pipe which supplies the jack, the descent occurs relatively slowly which results in a poor cut.

The same phenomenon of too slow a descent will also occur if during use the mower encounters a hole in the ground.

In order to attempt to resolve this problem the hydraulic jack has been modified by disconnecting the piston from the rod (compare to document EP-A-0,495,210). Thus, when during use the mower passes over a bump, it will only be the rod which is quickly displaced, while the piston should approximately maintain its position. In this manner the descent of the mower must be quicker once the bump is passed because there is no oil to be extracted from the jack.

But, because the pump continues to discharge oil, the piston even will be displaced somewhat in the cylinder, so that the mower will certainly not quickly recover its initial position. Besides, as during the entire passage over the bump, the piston is no longer in contact with the stop provided at the end of the rod there will be no transfer of weight of the mower to the tractor.

In addition, this modified mower has the same disadvantages as the one described previously in case of encountering a hole, since, here also, oil must be dispersed outside the small chamber of the jack.

SUMMARY OF THE INVENTION

An object of the present invention is to simplify and make the operation of adjusting the lightening of the harvesting mechanism of a mowing machine quicker while preserving the advantages achieved by using an elastically deformable member.

For this purpose a first mowing machine in accordance with the present invention is described, which includes:

- a harvesting mechanism which extends, during mowing, transversely to a working direction;
- a carrying structure which includes in particular a connection means used to attach the mowing machine to a drive vehicle;
- a connection device which attaches the harvesting mechanism to the carrying structure in order to allow heightwise displacement of the harvesting mechanism with respect to the carrying structure; and
- a device for lightening the harvesting mechanism which includes one (several) elastically deformable member (s) whose action (of each one) can be adjusted by means of an adjustment device connected to the elastically deformable member(s) which (of which each one) is comprised of a deformable envelope which contains a gas under regulatable pressure, the adjustment device including in particular a supply circuit provided with a gate connected to the (each) deformable envelope and used, in order to adjust the pressure value of the gas contained in the deformable envelope, to cause penetration into the deformable envelope of a fluid delivered by a supply source, to maintain the pressure of the gas contained in the deformable envelope, or to cause some fluid of the deformable envelope to flow out.

In the present invention, each gate is an electrovalve which is electrically controllable by the user from the driving position of the drive vehicle and includes at least two positions:

- a first position in which fluid can neither enter nor leave the deformable envelope; and
- a second position in which some fluid can enter or leave the deformable envelope.

A second mowing machine in accordance with the present invention includes:

- a harvesting mechanism which extends, during mowing, transversely to the working direction;
- a carrying structure which includes in particular a connection means used to attach the mowing machine to a drive vehicle;
- a connection device which attaches the harvesting mechanism to the carrying structure so as to allow heightwise displacement of the harvesting mechanism with respect to the carrying structure; and
- a device for lightening the harvesting mechanism which includes one (several) elastically deformable member (s) whose action (of each one) can be adjusted by means of an adjustment device which is attached to the elastically deformable member(s) which (of which each) is comprised of a mechanical spring.

In the present invention, the adjustment device includes a jack connected to the (for each) mechanical spring, as well as a supply circuit provided with a gate connected to the (each) jack and used, in order to adjust action of the corresponding mechanical spring, to cause penetration into the jack of a fluid supplied by a supply source, to maintain fluid in the jack or to cause discharge of fluid from the jack, the (each) gate being controllable by the user from the driving position of the drive vehicle and including at least two positions:

- a first position in which fluid can neither enter nor leave the jack; and
- a second position in which fluid can enter or leave the jack.

In the mowing machines in accordance with the present invention the user can, from the driving position of the motorized vehicle, according to the specific situation, increase or decrease the action of the elastically deformable member(s) until they work in the best manner. A skillful driver will be able to perform this operation without interrupting the mowing.

If, during the work, the user notices that the behavior of the mowing machine has changed, all that the driver needs to do, without leaving his driving position, and without interrupting the mowing operation as already stated, is to readjust the value of the action achieved by the elastically deformable member(s).

Therefore, in mowing machines in accordance with this invention adjustment of the amount of lightening is quite simple and very quick, which should allow users to work with better adjusted mowing machines.

Also, this adjustment can be accomplished with complete safety since the user does not have to leave his driving position.

Finally, these advantages are obtained with relatively simple means and by completely keeping the advantages of the elastically deformable member as a lightening means.

The elastically deformable member of the first mowing machine in accordance with the present invention could be comprised of an air bag or of a hydraulic jack and a gas accumulator (generally nitrogen) which are installed in series.

In the first case (air bag), the supply circuit could include, upstream from the gate(s) connected to the air bag(s), another gate which is branched in series with the gate(s) and which includes:

- a first position in which the air is allowed to escape; and
- a second position in which the air is not allowed to escape.

This other gate will advantageously be comprised of an electrovalve in which, preferably, the first position will be a neutral position and the second position will be an energized position.

Preferably there will also be a provision made so that the escape of air contained in the air bag(s) is accomplished to the outside air.

In addition it will advantageously be provided that upstream from the gate(s) connected to the air bag(s) the supply circuit will include a safety valve which prevents high pressure in the circuit.

The compressed air supply source could be comprised of a pneumatic power unit provided directly on the drive vehicle or by an air compressor installed on the mowing machine. The latter could be actuated by a power take-off of the drive vehicle or by an auxiliary motor which is also preferably installed on the mowing machine. This auxiliary motor could be of the hydraulic or electrical type.

Additionally, it could be provided that a means would cause actuation of the other gate in its second position when the auxiliary motor is actuated. If the auxiliary motor is an electric motor, this means could be comprised of a simple electrical connection. If, on the contrary, the auxiliary motor is a hydraulic motor the means could be comprised of an electric pressure contactor.

In the case in which the elastically deformable member is comprised of a hydraulic jack and a gas accumulator installed in series, the oil will preferably be provided by the hydraulic power unit of the drive vehicle. A throttle-valve, preferably of the adjustable type, could be provided upstream from the hydraulic jack in order to facilitate adjustment of the amount of lightening.

Such a throttle-valve could, for the same purpose, also be provided upstream from the jack provided in the second mowing machine in accordance with the present invention in the case in which this jack is a hydraulic jack.

It should be specified that the use of the word "upstream" in the foregoing and following description should be understood by referring to the supply circuit in the direction supply source toward air bag, hydraulic jack and gas accumulator installed in series (first mowing machine) or jack (second mowing machine).

For the case in which one provides at least two elastically deformable members (preferably one near at least each end of the harvesting mechanism), the action of the latter could advantageously be adjustable individually or simultaneously.

The present invention therefore relates to a mowing machine which comprises a harvesting mechanism which extends, during mowing, transversely to a working direction; a carrying structure which includes a connection means which is used to connect the mowing machine to a drive vehicle; a connection device which connects the harvesting mechanism to the carrying structure in order to allow a heightwise displacement of the harvesting mechanism with respect to the carrying structure; and a lightening device of the harvesting mechanism which includes at least one elastically deformable member whose action can be adjusted by means of an adjustment device which is attached to the at least one elastically deformable member.

The at least one elastically deformable member comprises a deformable envelope which contains a gas under pressure. The adjustment device includes a supply circuit provided with at least one gate connected to the deformable envelope and used, to adjust a pressure value of the gas contained in the deformable envelope, to cause a fluid supplied by a supply source to enter the deformable envelope, to maintain the pressure of the gas contained in the deformable envelope, or to cause fluid to leave the deformable envelope.

The at least one gate is an electrovalve electrically controllable by a user from a driving position of the drive vehicle and which includes at least a first position in which a fluid cannot enter or leave the deformable envelope, and a second position in which fluid can enter or leave the deformable envelope.

The present invention also provides for a mowing machine which comprises a harvesting mechanism which extends, during mowing, transversely to a working direction; a carrying structure which includes a connection means which is used to connect the mowing machine to a drive vehicle; a connection device which connects the harvesting mechanism to the carrying structure in order to allow a heightwise displacement of the harvesting mechanism with respect to the carrying structure; and a lightening device of the harvesting mechanism which includes at least one elastically deformable member whose action can be adjusted by means of an adjustment device which is attached to the at least one elastically deformable member which is comprised of a mechanical spring.

The adjustment device includes at least one jack connected to the mechanical spring and a supply circuit provided with at least one gate connected to the jack and used, to adjust action of the corresponding mechanical spring, to cause fluid supplied by a supply source to enter the jack, to maintain the fluid in the jack, or to cause fluid to go out of the jack. The at least one gate is controllable by a user from a driving position of the drive vehicle and includes at least a first position in which fluid cannot enter or leave the jack, and a second position in which fluid can enter or leave the jack.

BRIEF DESCRIPTION OF THE DRAWINGS

In describing the preferred embodiments of the present invention illustrated in the drawings, specified terminology is employed for the sake of clarity. However, the invention is not intended to be limited to the specific terminology so selected, and it is to be understood that each specific element includes all technical equivalents which operate for a similar purpose.

A more complete appreciation of the invention and many of the attendant advantages thereof will be readily obtained as the same becomes better understood by reference to the following detailed description when considered in connection with the accompanying drawings, wherein:

FIG. 5 shows, in cut-away view, the lifting and lightening member of FIG. 4 in its transport position;

FIG. 7 shows the electrovalves connected to the air bags in energized position;

FIG. 8 shows the electric pressure contactor and the discharge electrovalve in energized position;

FIG. 9 schematically shows a second example of implementation of the lightening members and their feeding;

FIG. 10 shows, in energized position, the electrovalves connected to the lightening members of the second example of implementation;

FIG. 11 shows a lateral view of one example of implementation of a second mowing machine in accordance with the invention placed in working position.

DESCRIPTION OF THE PREFERRED EMBODIMENTS

Figure 1:
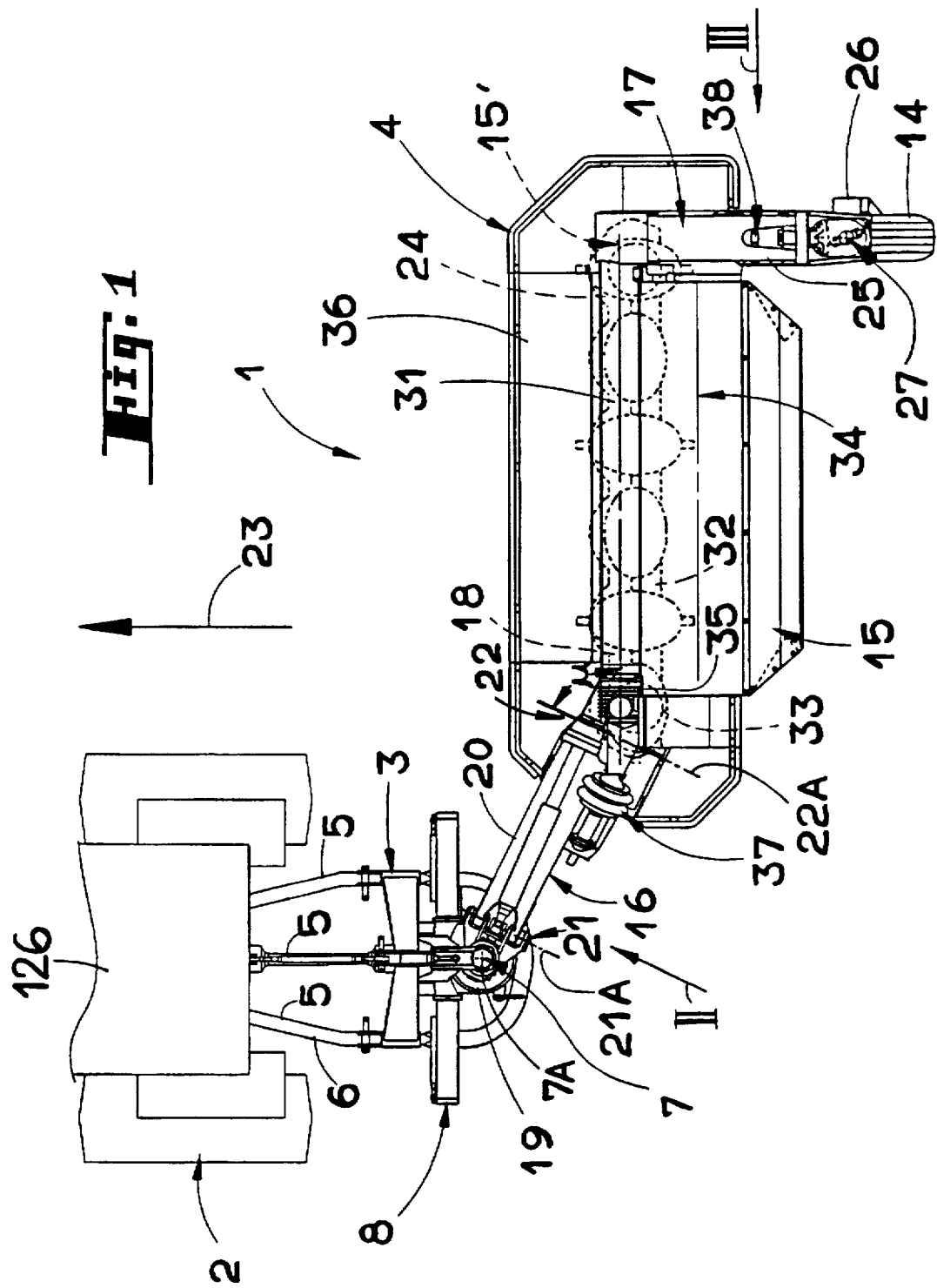
FIG. 1 shows a top view of one example of implementation of a first mowing machine in accordance with the invention which is connected to a farm tractor and which is placed in a working position.

Referring now to the drawings, wherein like reference numerals designate identical or corresponding parts throughout the several views, in FIGS. 1 to 8 a first mowing machine (1) is shown which is related to the one described in the documents EP-A-0,570,314, EP-A-0,570,315, EP-A-0,570,316 and EP-A-0,579,564, and to which one could refer if necessary.

In FIG. 1, the mowing machine (1) is shown attached to an agricultural tractor (2) and in a working position. The mowing machine (1) is comprised of an attachment (3) and a main body (4).

The attachment (3) is to be attached, at its front part, to three points (5) of a lifting device (6) of the tractor (2). The main body (4) is connected to the attachment (3) by means of a cylindrical joint (7) with a geometric axis (7A) which is at least approximately vertical. The angular position of the main body (4) with respect to the attachment (3) can be modified by pivoting the main body (4) about the geometric axis (7A). Placing the main body (4) into the desired angular position is achieved due to action of a hydraulic jack (8). The main body (4) can thus be brought from a transport position (not shown here), in which it will extend longitudinally behind the tractor (2) in the working position (FIG. 1), where it will extend at least approximately along the side of the tractor path (2). When the main body (4) is in its working position, one prevents oil from flowing from the jack (8), which has the effect of blocking pivoting of the main body (4) about the geometric axis (7A). On the contrary, during transport the jack (8) allows free pivoting of the main body (4) about the geometric axis (7A). For this reason, during transport, the main body (4) behaves as a trailer considering that it is provided with one wheel (14) which is installed on its longitudinal end distant from the attachment (3).

The main body (4) of the mowing machine (1) also includes a harvesting mechanism (15), two connection members (16, 17) and two lifting and lightening members (37, 38).

Figure 2:
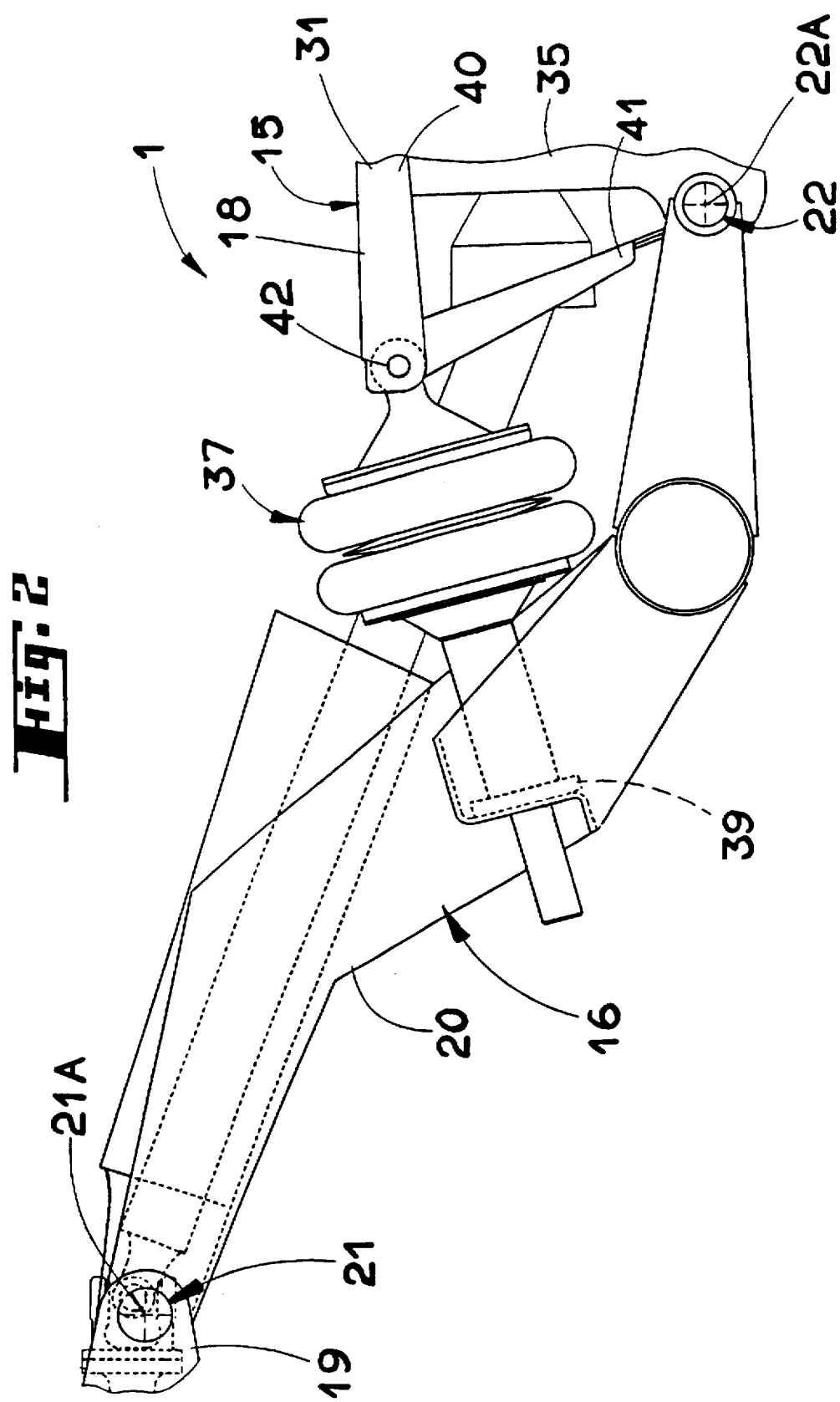
FIG. 2 shows a view along arrow II defined on FIG. 1.
Figure 3:
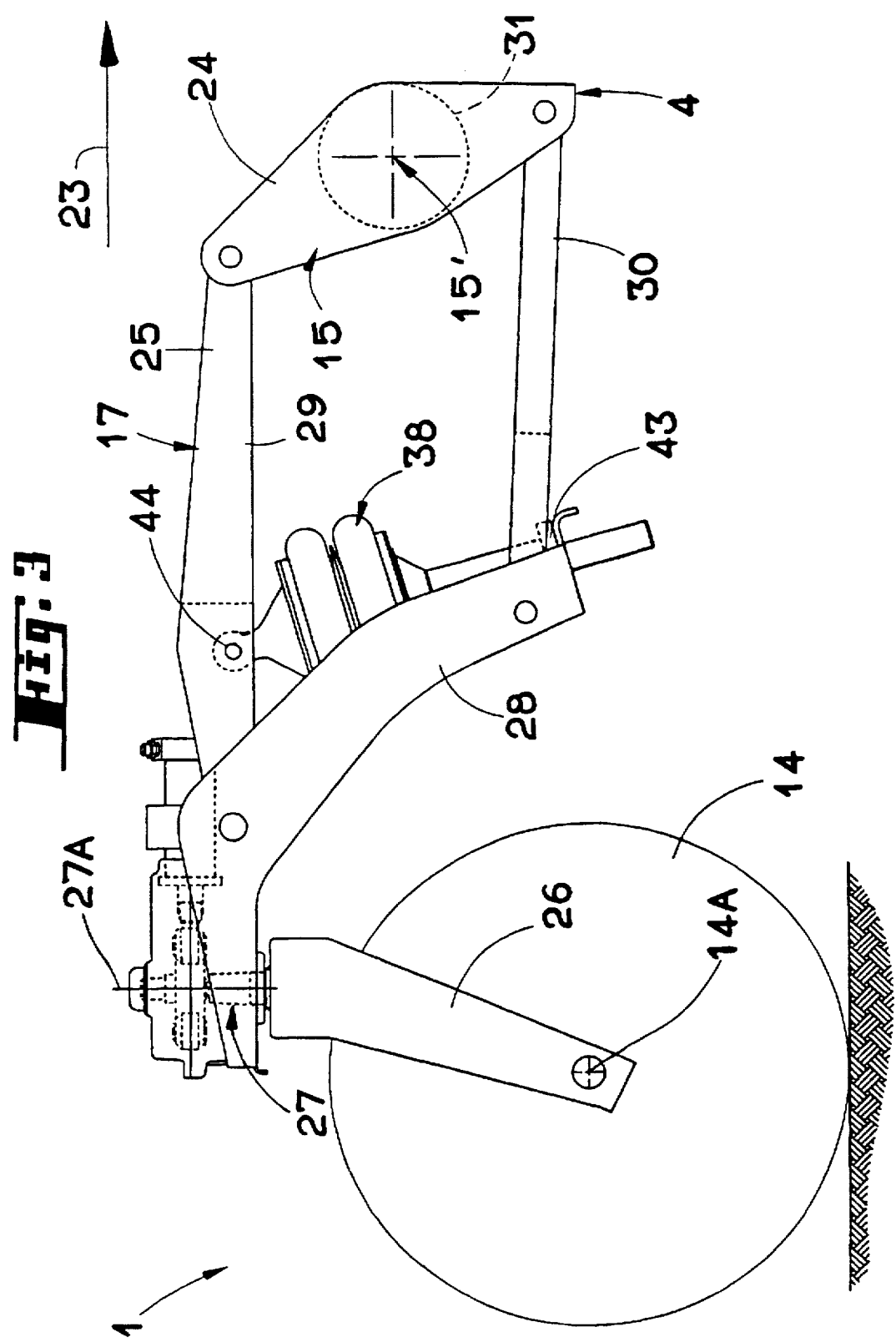
FIG. 3 shows a view along arrow III defined on FIG. 1.

The first connection member (16) which is shown in more detail in FIG. 2 connects the first longitudinal end (18) of the harvesting mechanism (15) to the attachment (3). For this purpose the first connection member (16) is comprised of a head (19) installed in pivoting fashion about the geometric axis (7A) of the attachment (3), and of an oscillating arm (20) which connects the harvesting mechanism (15) to the head (19). Because of the oscillating arm (20), the first longitudinal end (18) can be displaced heightwise in a considerable manner with respect to the attachment (3) in order to adapt itself to the relief of the terrain. For this purpose the oscillating arm (20) is connected, at one of its ends, to the head (19) by means of a first pivot joint (21) whose geometric axis (21A) extends at least approximately orthogonally to the longitudinal axis of the oscillating arm (20) and to the geometric axis (7A). At its other end the oscillating arm (20) is connected to the harvesting mechanism (15) by means of a second pivot joint (22) with geometric axis (22A) which is at least approximately parallel to the geometric axis (21A) of the first pivot joint (21). Additionally, the geometric axis (22A) of the second pivot joint (22) extends, looking along the working direction (23), at least approximately at mid-height of the harvesting mechanism (15) and will form, as seen from above, an angle (μ) of approximately 60° with the longitudinal axis (15') of the harvesting mechanism (15).

The second connection member (17) (FIG. 3) connects the second longitudinal end (24) of the harvesting mechanism (15) to the wheel (14). The second connection member (17) is comprised of a deformable quadrilateral (25) and of a guide member (26) of the wheel (14). The deformable quadrilateral (25) extends, as seen from above, at least approximately orthogonally to the longitudinal axis (15') of the harvesting mechanism (15). The guide number (26) of the wheel (14), for its part, is connected to the deformable quadrilateral (25) by means of a cylindrical articulation (27) with a geometric axis (27A) which is at least approximately vertical. By virtue of this arrangement the second longitudinal end (24) of the harvesting mechanism (15) can easily move heightwise with respect to the wheel (14) in order to adapt itself to the terrain relief, while still allowing pivoting of the wheel (14). The deformable quadrilateral (25) includes a bracket (28), at the upper part of which is connected the guide number (26) of the wheel (14), and two connecting rods (29, 30) which connect the bracket (28) to the harvesting mechanism (15). The deformable quadrilateral (25) has at least approximately the shape of a parallelogram whose side comprised of the bracket (28) extends upward and toward the rear with respect to the working direction (23), so as to provide for a space which allows the wheel (14) to pivot 360° about the geometric axis (27A).

The harvesting mechanism (15) which extends between the two connection members (16, 17) includes a support beam (31) to which the two connection members (16, 17) are attached. The support beam (31) supports a cutting bar (32) which is outfitted with cutting members (33) (rotating disks provided with articulated blades), and a processing rotor (34) (for which only the rotational axis is shown in FIG. 1) used to process the product cut by the cutting members (33). The support beam (31) extends at least approximately orthogonally to the working direction (23) and includes an intake box (35) which is used to drive the cutting members (33) and the processing rotor (34). The intake box (35) is installed in the vicinity of the second pivot joint (22) which connects the first connection member (16) to the harvesting mechanism (15). The harvesting mechanism (15) also includes protection members (36) which extend around the cutting bar (32) and the processing rotor (34).

Lightening of the harvesting mechanism (15) is achieved by means of two lifting and lightening members (37, 38) each one connected to a corresponding connection member (16, 17). The first lifting and lightening member (37) (FIG. 2), is installed between the oscillating arm (20) of the first connection member (16) and the support beam (31) of the harvesting mechanism (15). As can be seen in FIG. 2 the first lifting and lightening member (37) is connected on the one hand at least approximately in the middle of the oscillating arm (20) by means of an elastic articulation (39) and on the other hand to the intake box (35) of the support beam (31) by means of two arms (40, 41). The two arms (40, 41) form with the intake box (35) a very rigid triangulation to which the first lifting and lightening member (37) is connected by means of an elastic ring (42). By virtue of the elastic articulation (39) and the elastic ring (42), the lifting and lightening member (37) has easy installation and silent operation. Moreover, the vibrations are damped.

The second lifting and lightening member (38) (FIG. 3) extends between the lower part of the bracket (28) of the deformable quadrilateral (25) to which it is connected by means of an elastic articulation (43), and the upper connecting rod (29) of the deformable quadrilateral (25) to which it is connected by means of an elastic ring (44).

Figure 4:
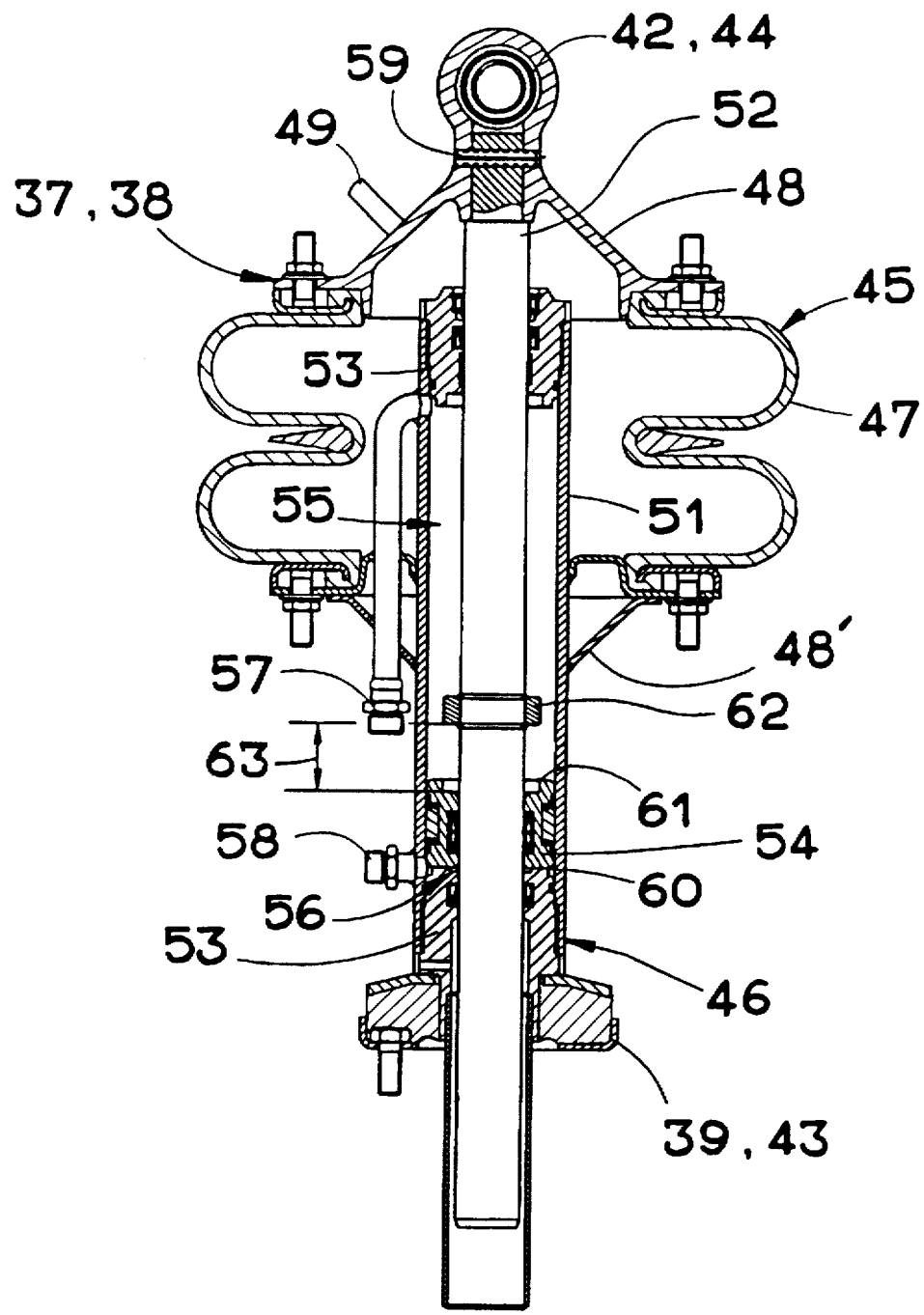
FIG. 4 shows, in partial cut-away view, a lifting and lightening member in its working position.
Figure 6:
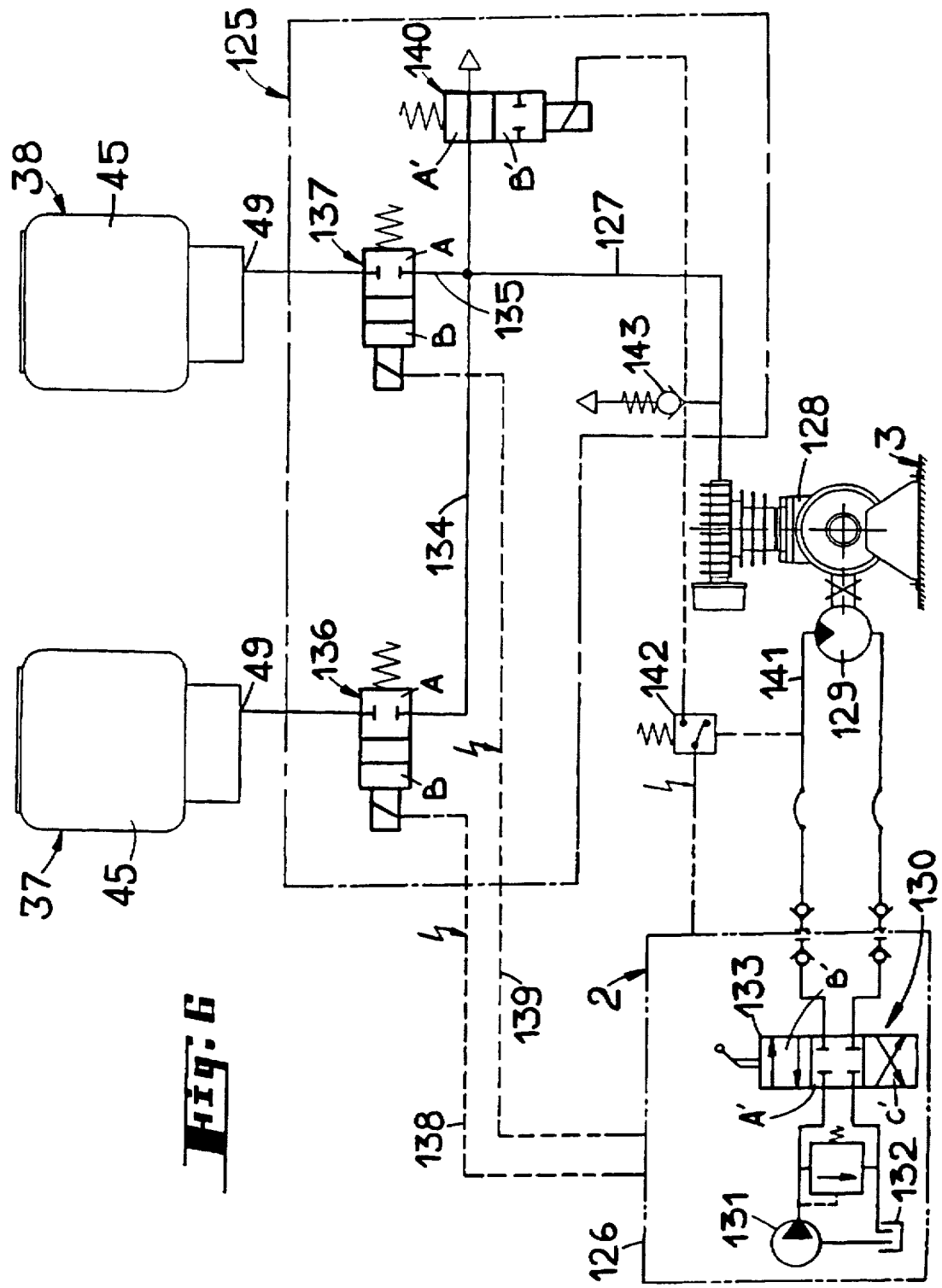
FIG. 6 schematically shows the feeding of air bags of the lifting and lightening members.

Such a lifting and lightening member (37, 38) appears in FIGS. 4 and 5.

The latter includes an air bag (45) (elastically deformable member) which is used, during operation, to lighten the harvesting mechanism (15). The air bag (45) is installed in parallel with a lifting jack (46) which allows one to lift the harvesting mechanism (15) when the user desires to do so. The air bag (45) includes a circular deformable membrane (47) and two flanges (48, 48') which are each attached to a corresponding longitudinal end of the circular membrane (47). The air bag (45) contains some air which can be brought to the desired pressure level by means of a valve (49) which is installed on one of the flanges (48, 48'). By inflating the air bag (45) to greater or smaller pressure level through the valve (49), the user has the opportunity to adjust the lightening value to the encountered working conditions. This operation as well as the means which allow it to be achieved will be described subsequently.

The lifting jack (46), for its part, includes in particular a cylinder (51) and a rod (52). The rod (52) is attached to the upper flange (48) of the air bag (45) by means of a pin (59), while the cylinder (51) is connected rigidly to the lower flange (48') of the air bag (45). At each of its ends the cylinder (51) is provided with an airtight guide ring (53) which allows the rod (52) to open out on both sides of the cylinder (51). During operation the two flanges (48, 48') of the air bag (45) therefore can, subsequent to heightwise displacements of the harvesting mechanism (15), approach or move away from one another since the rod (52) can slide back and forth in the cylinder (51).

In order to lift the harvesting mechanism (15) a piston (54) is provided which is installed in sliding manner on the rod (52) and separates the cylinder (51) into two distinct chambers (55, 56) each one supplied through its own respective pipe (57, 58). During operation the lower chamber (56) of the cylinder (51) is empty and the lower side (60) of the piston (54) rests, due to action of the oil contained in the upper chamber (55), against the lower guide ring (53). Additionally, the upper side (61) of the piston (54) is intended to rest against a collar (62) installed a little higher on the rod (52) of the lifting jack (46). Since during operation there will be a certain amount of play (63) between the upper side (61) of the piston (54) and the collar (62) of the rod (52), the piston (54) will not disturb operation of the air bag (45). When the user wishes to lift the harvesting mechanism (15) he will feed the lower chamber (56) of the cylinder (51), which has the effect of translating the piston (54) upward and of elongating the lifting jack (46) as soon as the piston (54) arrives in contact with the collar (62) of the rod (52). In its lifted position the harvesting mechanism (15) will extend at least approximately parallel above the ground and the action of the air bags (45) is canceled (FIG. 5).

The energizing of the cutting members (33) and of the processing rotor (34) of the harvesting mechanism (15) is not described since it is explained in the document EPA-0, 570,316.

The same is true for the orientation and locking device of the wheel (14) in transport position. This device is in effect explained in the document EP-A0,570,314.

Thus, in the mowing machine (1) which has just been described:
  the carrying structure of the harvesting mechanism (15) is comprised of the attachment (3) and the wheel (14);
  the connection device is comprised of the first connection member (16) which connects the harvesting mechanism (15) to the attachment (3) and by the second connection member (17) which connects the harvesting mechanism (15) to the wheel (14); and
  the lightening device is comprised of the first lifting and lightening member (37) and the second lifting and lightening member (38).

In accordance with the invention the mowing machine (1) includes in addition a device (125) (FIG. 6) which allows one to adjust the pressure of the air contained in the air bags (45) of the lifting and lightening members (37, 38) from the driver's position (126) of the tractor (2).

The device (125) for adjusting the pressure includes a supply circuit (127) which is used in particular to feed the air bags (45) with air under pressure provided by a compressor (128). The compressor (128) which is installed on the mowing machine (1), is driven by a hydraulic motor (129) which is also installed on the mowing machine (1). The hydraulic motor (129) is itself driven by a hydraulic power unit (130) of the tractor (2) when the compressor (128) has to furnish air to the circuit (127). The hydraulic power unit (130) of the tractor (2) includes, in a known manner, a pump (131), a tank (132) and at least one distributor (133).

Energizing of the hydraulic motor (129) is controlled by the user from the driving position (126) of the tractor (2) by means of an adequate distributor (133).

Although the compressor (128) is equipped with a filter at the level of its aspiration, it is important to install the latter at a place where the air to be aspirated will contain the least possible amount of dust. For this purpose it is provided that one installs the compressor (128) on the attachment (3). It will thus be located relatively far from the harvesting mechanism (15) which is generally a generator of dust.

At the output of the compressor (128) the supply circuit (127) divides then into two branches (134, 135):
  the first branch (134) will feed the air bag (45) of the first lifting and lightening member (37) and includes an electrovalve (or gate) (136) with two positions (A, B);
  the second branch (135) feeds the air bag (45) of the second lifting and lightening member (38) and also includes an electrovalve (or gate) (137) which is identical to electrovalve (136).

The control valves (136, 137) have electrical control (138, 139) and can therefore be controlled from the driver's position (126) of the tractor (2). In the first position (A) (FIG. 6) which is the neutral position, air cannot enter or leave the corresponding air bag (45). In the second position (B) on the contrary (FIG. 7), which is the energized position, the air can, according to the situation, enter or leave the corresponding air bag (45). The control valves (136, 137) are placed in the second position (B) when the user actuates the corresponding electrical control (138, 139), and then they will automatically return to the first position (A) as soon as the user no longer actuates the respective electrical control (138, 139). The fact of being able to separately control each control valve (136, 137) allows one to exactly adjust the value of the pressure of air inside each air bag (45) as a function of the load which is applied to it. If necessary one could provide a pressure-gauge which would allow one to see the value of pressure in each air bag (45).

Between the compressor (128) and the two control valves (136, 137) which are connected to the air bags (45), the supply circuit (127) also includes another electrovalve (140) with two position (A', B'). In the first position (A') (FIG. 6) which is the neutral position, the supply circuit (127) communicates with the outside air. In the second position (B') on the contrary (FIG. 8), which is the energized position, the air cannot escape from the supply circuit (127).

The implementation of the other control valve (140) in its second position (B') is controlled in the following manner. An electrical pressure contactor (142) is branched to a pressure pipe (141), upstream from the hydraulic motor (129). As soon as the user actuates the distributor (133) of the tractor (2) in order to begin energizing the hydraulic motor (129), the pressure prevailing in the pipe (141) makes the electrical contactor (142) conducting (FIG. 8). The control valve (140) is supplied and is placed in the second position (B') (FIG. 8). When energizing of the hydraulic motor (129) is stopped the electrical contactor (142) again cuts off the electric current and the control valve (140) returns to neutral position (A').

Downstream from the compressor (128) the supply circuit (127) finally also includes a safety valve (143) which protects the different members against excessive pressure. The escape at the level of this valve (143) is effected to the outside air.

The device (125) which allows one to adjust pressure of the air contained in the air bags (45) of the lifting and lightening members (37, 38) from the driver's position (126) of the tractor (2) works in the following manner.

After having coupled the mowing machine (1) to the tractor (2), the user manually controls the value of the lightening of the harvesting mechanism (15). To do this he lifts up one after the other each longitudinal end (18, 24) of the latter. During this test he determines if lightening of the harvesting mechanism (15) is approximately identical at each longitudinal end (18, 24) of the latter and, considering his experience, if the value of this lightening is approximately correct. If necessary he will make an initial rough correction.

Thus, in a situation in which lightening is not approximately identical at each longitudinal end (18, 24) of the harvesting mechanism (15), he will try to achieve equilibrium again by causing some air to leave the air bag (45) located on the longitudinal end (18, 24) which is too light or by adding some air to the air bag (45) located at the longitudinal end (18, 24) which is too heavy.

In the first case the user controls, from the driver's position (126) of the tractor (2), the corresponding control valve (136, 137) for the air bag (45) to be deflated somewhat. The air will then leave the air bag (45) and escape into the outside air through the corresponding control valve (136, 137) and the control valve (140).

In the second case, the user actuates the hydraulic power unit (130) of the tractor (2) and the control valve (136, 137) which corresponds to the air bag (45) to be inflated. The compressor (128) then discharges some air into the air bag (45) (the pipe (141) being under pressure, the control valve (140) is in closed position (B')).

If it is the amount of lightening which is not correct, he will add some air to the two air bags (45) in the case when lightening is insufficient or, will cause some air to leave the two air bags (45) in situations when the lightening is too great. In the first case he will actuate the hydraulic power unit (130) of the tractor (2) and the two control valves (136, 137) so that the compressor (128) will discharge some air into the two air bags (45) (pipe) (141) being under pressure, the control valve (140) is in closed position (B')). In the second case, on the other hand, he will control only the two control valves (136, 137) to cause some air to leave the air bags (45).

After this first rough adjustment, the user can begin the mowing operation to, if necessary, more finely tune this first adjustment.

If the lightening is insufficient the harvesting mechanism (15) will rest too heavily on the ground and will cause visible tracks on the terrain. The user will then actuate the hydraulic power unit (130) of the tractor (2) and the two control valves (136, 137) in order to add some air to the two air bags (45) until these tracks fade away or disappear.

On the other hand, if the lightening is too great, the harvesting mechanism (15) will sway and the result will be irregular cutting. The user then will actuate only the two control valves (136, 137) by means of their respective electrical controls (138, 139) in order to cause air to be discharged from the two air bags (45). He will stop this action as soon as the swaying of the harvesting mechanism (15) fades away or disappears.

If only one of the longitudinal ends (18, 24) of the harvesting mechanism (15) is lightened too much, it will sway and the result will be an irregular cut in its wake. To remedy this situation the operator will then actuate only the corresponding control valve (136, 137) by means of the electrical control (138, 139) of the latter in order to cause air to leave the corresponding air bag (45) until the cut is regular over the entire width of the harvesting mechanism (15).

If, on the contrary, only one of the longitudinal ends (18, 24) of the harvesting mechanism is insufficiently lightened, it will cause in its wake a visible track on the ground. In order to eliminate the latter, the user will actuate the hydraulic power unit (130) of the tractor (2) and the corresponding control valve (136, 137) in order to add some air to the respective air bag (45) until the track fades away or disappears.

The lightening member (144, 145) of the harvesting mechanism (15) shown schematically in FIG. 9 each will include:
- a cylinder (146);
- a piston (147) which is one piece with a rod (148) exiting from one of the longitudinal ends of the cylinder (146); and
- a membrane (149) which separates the internal volume of the cylinder (146) which is not traversed by the rod (148) in a first deformable chamber (150) containing a gas (generally nitrogen) and a second deformable chamber (151) which is used to receive oil through an intake opening (152).

The internal volume of the cylinder (146) traversed by the rod (148) is, for its part, in communication with outside air.

The pressure of the gas contained in the first chamber (150) of each lightening member (144, 145) can be adjusted by the user from the driver's position (126) of the tractor (2) by injecting some oil into the second chamber (151) of the lightening member (144, 145) (increase of the pressure of the gas contained in the first chamber (150), that is to say increase of the amount of lightening) or, on the contrary, by causing oil to depart from the second chamber (151) (decrease of the pressure of gas contained in the first chamber (150), that is to say decrease of the amount of lightening). This adjustment is effected by means of an adjustment device (153).

The device (153) which adjusts the pressure includes a supply circuit (154) which is used to feed the second chamber (151) of each lightening member (144, 145) with oil furnished by the hydraulic power unit (130) of the tractor (2). The supply circuit (154) includes two branches (155, 156):
- the first branch (155) which is connected to the first lightening member (144) and which includes an electrovalve (or gate) (157) with two positions (A, B); and
- the second branch (156) which is connected to the second lightening member (145) and which includes an electrovalve (or gate) (158) with two positions (A, B) identical to the control valve (157).

The control valves (157, 158) have electrical control (159, 160) and can be operated from the driver's position (126) of the tractor (2). When the user does not actuate the control valves (157, 158), the latter are in their first position (A)

(FIG. 9) in which no circulation of oil is possible, not in any direction (the distributor (133) of the hydraulic power unit (130) of the tractor (2) is in neutral position (A')). When the user wishes to cause oil to enter the second chamber (151) of a lightening member (144, 145), he actuates electrically the corresponding control valve (157, 158) so that the latter will be in position (B) (FIG. 10) and he will simultaneously actuate the hydraulic power unit (130) of the tractor (2) (distributor (133) in position (B')) so that the pump (131) of the latter will provide oil to the corresponding branch (155, 156). When, on the contrary, the user desires to cause oil to leave the second chamber (151) of a lightening member (144, 145), he will actuate electrically the corresponding control valve (157, 158) so that the latter will be in position (B) (FIG. 10) and he will simultaneously actuate the hydraulic power unit (130) of the tractor (2) (distributor (133) in position (C')) in order to allow the oil which must leave the second chamber (151), to return to the tank (132) of the hydraulic power unit (130) of the tractor (2).

Between each control valve (157, 158) and the corresponding lightening member (144, 145), the supply circuit (154) also includes a throttle valve (161, 162), with adjustable section, which restricts circulation of oil in order to facilitate adjustment.

One will understand in any case that this throttle valve (161, 162) which is not however indispensable, could also be located upstream from the corresponding control valve (157, 158). One could even provide only one throttle valve located upstream of the two branches (155, 156).

Figure 12:
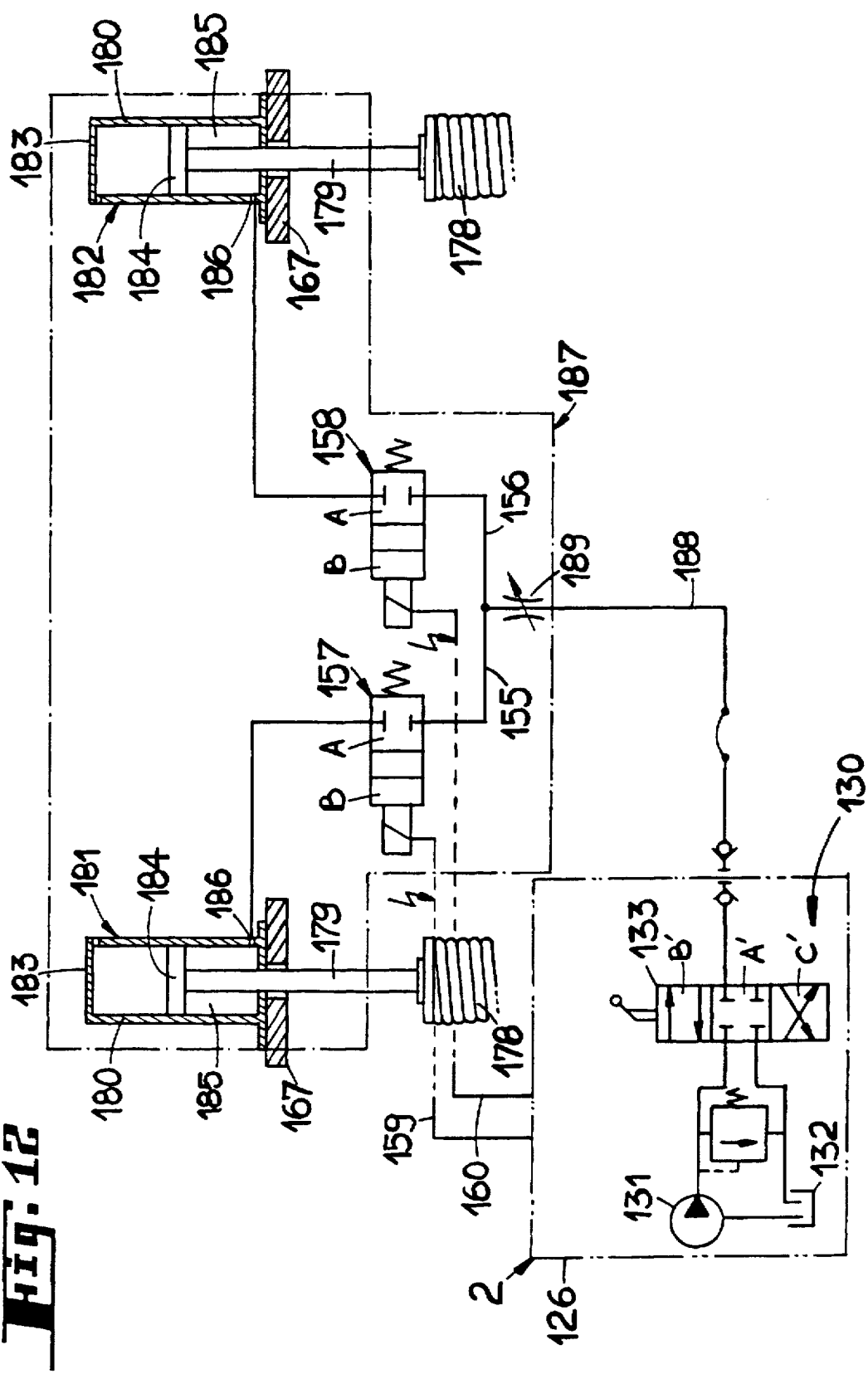
FIG. 12 schematically shows the lightening members of this second mowing machine and the feeding of the hydraulic jacks.

A second mowing machine (163) is shown in FIGS. 11 and 12 in its working position. It is comprised of a main body (164) and of a tongue (165) connected, at its trailing end, to the main body (164) by means of an articulation (166) with a geometric axis that is at least approximately vertical.

The angular position of the tongue (165) with respect to the main body (164) can be modified by causing the tongue (165) to pivot about the articulation axis (166). Putting it into the desired angular position and maintaining it in the latter are achieved by a hydraulic jack, for example (not shown).

The main body (164) of the mowing machine (163) also includes a chassis (167) which rests on the ground—especially during operation—by means of two wheels (168) which each extend near a respective outer end of the chassis (167). Each wheel (168) is connected to the chassis (167) by means of a wheel arm (169) which itself is connected to the chassis (167) by means of an articulation (170) with a geometric axis directed at least approximately orthogonally to the direction of forward movement (23) during operation. The geometric axes of the articulations (170) of the two wheel arms (169) are at least approximately merged. Between each wheel arm (169) and the chassis (167) there is also provided a hydraulic jack (171) which allows one to cause the wheel arm (169) and the corresponding wheel (168) to pivot with respect to the chassis (167) about the geometric axis of the corresponding articulation (170). This allows the chassis (167) to be near the ground (172) during the mowing phase and to be distant from the ground (172) when mowing is interrupted.

The main body (164) of the mowing machine (163) also includes a harvesting mechanism (173) which is provided, in a known manner, with cutting members and members for processing the product cut by the cutting members, such as conditioning members for example. The harvesting mechanism (173) is connected to the chassis (167) by means of a connection device (174) with deformable quadrilateral and a lightening device (175) which will be described subsequently.

Energizing of the harvesting mechanism (173) is, for example, implemented from the power take-off of a tractor (2) by means of a movement transmission device known by a person of the art, which transmits movement to a transmission shaft (176) which is connected in rotation to the intake shaft of an intake box (177) of the harvesting mechanism (173).

The lightening device (175) works with the connection device (174) and includes, at each longitudinal end of the harvesting mechanism (173), a traction spring (178).

Each traction spring (178) is connected, at its lower end, to one bar of the connection device (174) and, at its upper end, directly or indirectly to the rod (179) of a hydraulic jack (180) itself connected to the chassis (167).

In the mowing machine (163) which has just been described:

the carrying structure of the harvesting mechanism (173) is comprised of the tongue (165), the frame (167), the wheels (168) and their connection members to the chassis (167) (wheel arms (169)—jack (171));

the lightening device is comprised of the two lightening members (181, 182) (FIG. 12) which each include a traction spring (178) and the associated hydraulic jack (180).

Each hydraulic jack (180) includes:

a cylinder (183) connected to the chassis (167); and a piston (184) which is one piece with the rod (179) which comes out of one of the ends of the cylinder (183) and is connected, at its free end, to the corresponding traction spring (178).

The small chamber (185) of the hydraulic jack (180) is used to receive oil through an intake opening (186). The large chamber of the hydraulic jack (180), for its part, communicates with the outside air.

The action of the spring (178) of each lightening member (181, 182) can be adjusted by the user from the driver's position (126) of the tractor (2) by injecting some oil into the small chamber (185) of the corresponding hydraulic jack (180) (increase of volume of the small chamber (185), that is to say elongation of the traction spring (178) and, by this means, increase of the lightening) or, on the contrary, by causing oil to go out of the small chamber (185) (decrease of volume of the small chamber (185), that is to say shortening of the traction spring (178) and, for this reason, decrease of the lightening).

This adjustment is effected by means of an adjustment device (187) which includes a supply circuit (188) used to feed the small chamber (185) of the hydraulic jack (180) of each lightening member (181, 182) with oil supplied by the hydraulic power unit (130) of the tractor (2). This supply circuit (188) is identical to the supply circuit (154) described previously, except for the adjustable throttle valve (189) which in this case is located upstream of the two branches (155, 156).

The operation of the adjustment device (187) will not be described again because it is identical to that of the previously described adjustment device (153).

The electrical control (138, 139; 159, 160) of the electrovalves (136, 137; 157, 158) is not described because it is easily understood by a person working in this area. Indeed, these are simple contactors which, when they are actuated, will supply electric current to the corresponding solenoids of the electrovalves (136, 137; 157, 158).

Various modifications can be made to the examples of implementation which have just been described without thereby departing from the general scope of the present invention as defined in the following claims.

For example, it is therefore perfectly possible to use lightening members with a deformable envelope which contains a gas under pressure on mowing machines of the type shown in FIG. 11 in place of the lightening members (181, 182).

In the mowing machine shown in FIGS. 11 and 12 it is also possible to use compression springs or torsion bars in place of the traction springs (178).

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mowing machine comprising:
    a harvesting mechanism which extends, during mowing, transversely to a working direction;
    a carrying structure which includes a connection means which is used to connect the mowing machine to a drive vehicle;
    a connection device which connects said harvesting mechanism to said carrying structure in order to allow a heightwise displacement of said harvesting mechanism with respect to said carrying structure;
    a lightening device of said harvesting mechanism which includes at least one deformable envelope which contains a gas under adjustable pressure; and
    an adjustment device which is attached to said at least one deformable envelope in order to be able to adjust the action of said at least one deformable envelope, said adjustment device comprising:
    (i) a supply circuit provided with at least one electrovalve connected to said at least one deformable envelope and being able to take at least a first position and a second position, said at least one electrovalve maintaining the pressure of the gas contained in said at least one deformable envelope when said at least one electrovalve is in said first position, and said at least one electrovalve being able to cause a fluid supplied by a supply source to enter said at least one deformable envelope or to cause fluid to leave said at least one deformable envelope when said at least one electrovalve is in said second position; and
    (ii) electrical control means which allow a user of the mowing machine to control said at least one electrovalve from a driving position in the drive vehicle, to switch said at least one electrovalve between the at least first and second positions.

2. A mowing machine according to claim 1, wherein the first position is a neutral position while the second position is an energized position.

3. A mowing machine according to claim 1, wherein said at least one deformable envelope is comprised of an air bag.

4. A mowing machine according to claim 3, wherein said supply circuit includes, upstream from said at least one electrovalve connected to the air bag, a further gate which is branched in series with said at least one electrovalve and which includes:
    a first position of said further gate in which air can escape; and
    a second position of said further gate in which air cannot escape.

5. A mowing machine according to claim 4, wherein said further gate is a further electrovalve.

6. A mowing machine according to claim 5, wherein said first position of said further electrovalve is a neutral position, while said second position of said further electrovalve is an energized position.

7. A mowing machine according to claim 3, wherein the escape of air contained in said air bag is effected to the outside air.

8. A mowing machine according to claim 3, wherein said supply circuit includes, upstream from said at least one electrovalve connected to the air bag, a safety valve.

9. A mowing machine according to claim 3, wherein said supply source includes an air compressor installed on the mowing machine.

10. A mowing machine according to claim 9, wherein said air compressor is driven by an auxiliary motor which is also installed on the mowing machine.

11. A mowing machine according to claim 10, wherein: said supply circuit includes, upstream from said at least one electrovalve connected to said air bag, a further gate branched in series with said at least one electrovalve and which includes:
    a first position of said further gate in which air can escape;
    a second position of said further gate in which air cannot escape; and
    operating means which causes said further gate to be brought in said second position of said further gate when said auxiliary motor is actuated.

12. A mowing machine according to claim 11, wherein said auxiliary motor is an electric motor.

13. A mowing machine according to claim 12, wherein: said further gate is a further electrovalve; and
    said operating means is comprised of a simple electrical connection.

14. A mowing machine according to claim 11, wherein said auxiliary motor is a hydraulic motor.

15. A mowing machine according to claim 14, wherein: said further gate is a further electrovalve; and
    said operating means comprises an electrical pressure contactor.

16. A mowing machine according to claim 1, wherein said at least one deformable envelope is comprised of a hydraulic jack and a gas accumulator mounted in series.

17. A mowing machine according to claim 16, wherein a throttle valve is provided upstream from the hydraulic jack.

18. A mowing machine according to claim 17, wherein said throttle valve is adjustable.

19. A mowing machine according to claim 1, wherein at least two deformable envelopes are provided whose action can be adjusted individually or simultaneously.

20. A mowing machine according to claim 19, wherein each deformable envelope of said at least two deformable envelopes is provided near a corresponding end of said harvesting mechanism.

21. A mowing machine comprising:
    a harvesting mechanism which extends, during mowing, transversely to a working direction;
    a carrying structure which includes a connection means which is used to connect the mowing machine to a drive vehicle;
    a connection device which connects said harvesting mechanism to said carrying structure in order to allow a heightwise displacement of said harvesting mechanism with respect to said carrying structure;
    a lightening device of said harvesting mechanism which includes at least one mechanical spring; and an adjustment device which is attached to said at least one mechanical spring in order to be able to adjust the action of said at least one mechanical spring, said adjustment device comprising:
- (i) at least one jack connected to said at least one mechanical spring;
- (ii) a supply circuit provided with at least one gate connected to said at least one jack and being able to take at least a first position and a second position, said at least one gate maintaining fluid in said at least one jack when said at least one gate is in said first position, and said at least one gate being able to cause a fluid supplied by a supply source to enter said at least one jack and to cause fluid to leave said at least one jack when said at least one gate is in said second position; and
- (iii) a control means which allow a user of the mowing machine to control said at least one gate from a driving position in the drive vehicle, to switch said at least one gate between the at least first and second positions.

22. A mowing machine according to claim 21, wherein:
said at least one gate is an electrovalve; and
said control means is an electrical control.

23. A mowing machine according to claim 22, wherein said first position is a neutral position, and said second position is an energized position.

24. A mowing machine according to claim 23, wherein said at least one jack is a hydraulic jack, and the fluid is oil.

25. A mowing machine according to claim 24, wherein a throttle valve is provided upstream from said hydraulic jack.

26. A mowing machine according to claim 25, wherein said throttle valve is adjustable.

27. A mowing machine according to claim 21, wherein at least two mechanical springs are provided whose action can be adjusted individually or simultaneously.

28. A mowing machine according to claim 27, wherein each mechanical spring of said at least two mechanical springs is provided near a corresponding end of said harvesting mechanism.

* * * * *